United States Patent
Crawford et al.

[19]

[11] Patent Number: 5,982,610
[45] Date of Patent: Nov. 9, 1999

[54] MULTISIDED COMMUNICATION DISTRIBUTION CABINET HAVING ADJUSTABLE TIE ROD

[75] Inventors: William A. Crawford, Lakewood; David J. Michlovic, Avon Lake; Larry N. Cleveland, Vermilion, all of Ohio

[73] Assignee: RELTEC Corporation, Lorain, Ohio

[21] Appl. No.: 09/085,854

[22] Filed: May 27, 1998

[51] Int. Cl.$^6$ ..................................................... H02B 1/26
[52] U.S. Cl. ........................... 361/641; 361/600; 361/614; 361/622; 361/633; 174/65 R; 174/51; 174/52.1
[58] Field of Search ..................................... 361/600–602, 361/614, 622, 624, 627, 641, 644, 645, 826, 827, 724, 727; 312/223.2, 223.6; 174/59, 50, 60

[56] References Cited

U.S. PATENT DOCUMENTS

| | | | |
|---|---|---|---|
| 3,708,725 | 1/1973 | Burton et al. | 361/657 |
| 4,121,276 | 10/1978 | Kovatch et al. | 361/614 |
| 4,307,304 | 12/1981 | Kovatch et al. | 307/147 |
| 4,621,303 | 11/1986 | Rowe | 361/608 |
| 5,001,602 | 3/1991 | Suffi et al. | 361/724 |
| 5,070,429 | 12/1991 | Skirpan | 361/644 |
| 5,202,538 | 4/1993 | Skirpan | 174/65 R |
| 5,212,623 | 5/1993 | Wilson et al. | 173/38 |
| 5,295,041 | 3/1994 | Metivier et al. | 312/257.1 |
| 5,450,272 | 9/1995 | Van Gaal et al. | 361/690 |
| 5,535,102 | 7/1996 | Neill et al. | 361/645 |
| 5,548,489 | 8/1996 | Reed et al. | 361/827 |

*Primary Examiner*—Leo P. Picard
*Assistant Examiner*—Boris L. Chervinsky
*Attorney, Agent, or Firm*—Fay, Sharpe, Beall, Fagan, Minnich & McKee

[57] ABSTRACT

In a multisided access communication distribution cabinet, an adjustable tie rod is configured as part of mounting units. The adjustable tie rod is located between grooming bars of the mounting unit, fitted within slots allowing for the adjustable tie rod to move within an area defined by the slots. Wires/cables are passed through an opening defined by the adjustable tie rod and one of the grooming bars. Once the wires have been located in a desired location, the adjustable tie rod is moved into close association with the grooming bar such that the wires are held in a fixed position. Thereafter the adjustable tie rod is placed in a fixed position thereby holding the wires/cables in a secure manner.

18 Claims, 7 Drawing Sheets

MULTISIDED COMMUNICATION DISTRIBUTION CABINET HAVING ADJUSTABLE TIE ROD

BACKGROUND OF THE INVENTION

The present invention is directed to adjustable tie rods, and in particular to adjustable tie rods implemented within a multisided communication distribution cabinet such as disclosed in U.S. patent application Ser. No. 08/854,894, entitled Multisided Access Distribution Cabinet, commonly assigned and hereby incorporated by reference. Modular distribution units which can be held within the multisided access cabinet are disclosed in U.S. Pat. No. 5,726,852, entitled Modular DC Distribution Unit, commonly assigned and hereby incorporated by reference.

Distribution cabinets are in wide use. Within the communication industry a variety of cabinets having different characteristics are unknown. Some cabinets are constructed to have doors and locks on an outer surface such that access can be limited to appropriate personnel. Other cabinets include front panels which allow visual inspection of the components within a cabinet while denying access to the components.

No matter what configuration, these cabinets commonly have multiple wire/cable feeds for incoming power, wires/cables for internal connections, and wires/cables exiting the cabinet to remote locations.

Commonly, internal wires and cables in the cabinet are bundled together at convenient locations and tied to internal areas of the cabinet at tie areas. Typically these tie areas are integral with side-cover panels, to maintain the wiring in a secure position and to allow for an orderly organization of complicated wiring interconnections. Thus, the tying of wires/cables is accomplished at convenient locations within the internal structure of the cabinet.

Various safety agencies have requirements that these tie areas be insulated when they have edges of a predetermined angle. Particularly, the concern is that sharp-angled metal used in distribution cabinets will cut the wires/cables.

Thus, the cost of constructing a cabinet is increased not only due to the use of additional insulation material, but also the time to construct the cabinets is increased due to the requirement of providing such insulation. Also, while safety agencies require insulation, there is also the possibility the insulation will become loose or the insulation will not be placed at the appropriate locations. In such situations the likelihood of the wires/cables being cut is increased. Further, since the wires/cables are bundled together, the complexity of tracing an individual wire or cable is increased.

Therefore, the present inventors have determined a manner of securing wire/cables in an organized fashion which increases the ease of wiring/cabling of the cabinets by eliminating the need of bundling the wire/cables at the tie points.

SUMMARY OF THE INVENTION

The present invention therefore contemplates a new and improved distribution cabinet configured to hold modularized electronic components, wherein the configuration and construction of the cabinets are simplified by provision of adjustable tie rods.

Use of tie rods eliminate the need of insulation and the bundling of wires/cables at tie points. Such a system increases the ease with which a distribution cabinet can be configured and constructed, and eliminates the costs associated with the requirement of the insulation material and the additional time for construction.

According to a more limited aspect of the invention, use of adjustable tie rods in distribution cabinets, which allow for both front and rear access to modules internal to the cabinets is set forth.

Thus, an object of the present invention is to increase the ease with which a distribution cabinet can be constructed. An additional object is to decrease the costs associated with construction of such cabinets.

These together with other objects of the invention, along with the various features of novelty which characterize the invention, are pointed out with particularity in the claims annexed to and forming a part of this disclosure. For a better understanding of the invention, its operating advantages and the specific objects obtained by its uses, reference should be made to the accompanying drawings and descriptive matter in which there is illustrated preferred embodiments of the invention.

THE BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENT

Referring now to the drawings wherein the showings are for purposes of illustrating the preferred embodiment of the invention only and not for purposes of limiting same, FIGS. 1–9 illustrate a cabinet frame construction incorporating a preferred embodiment of the present invention.

Figure 1:
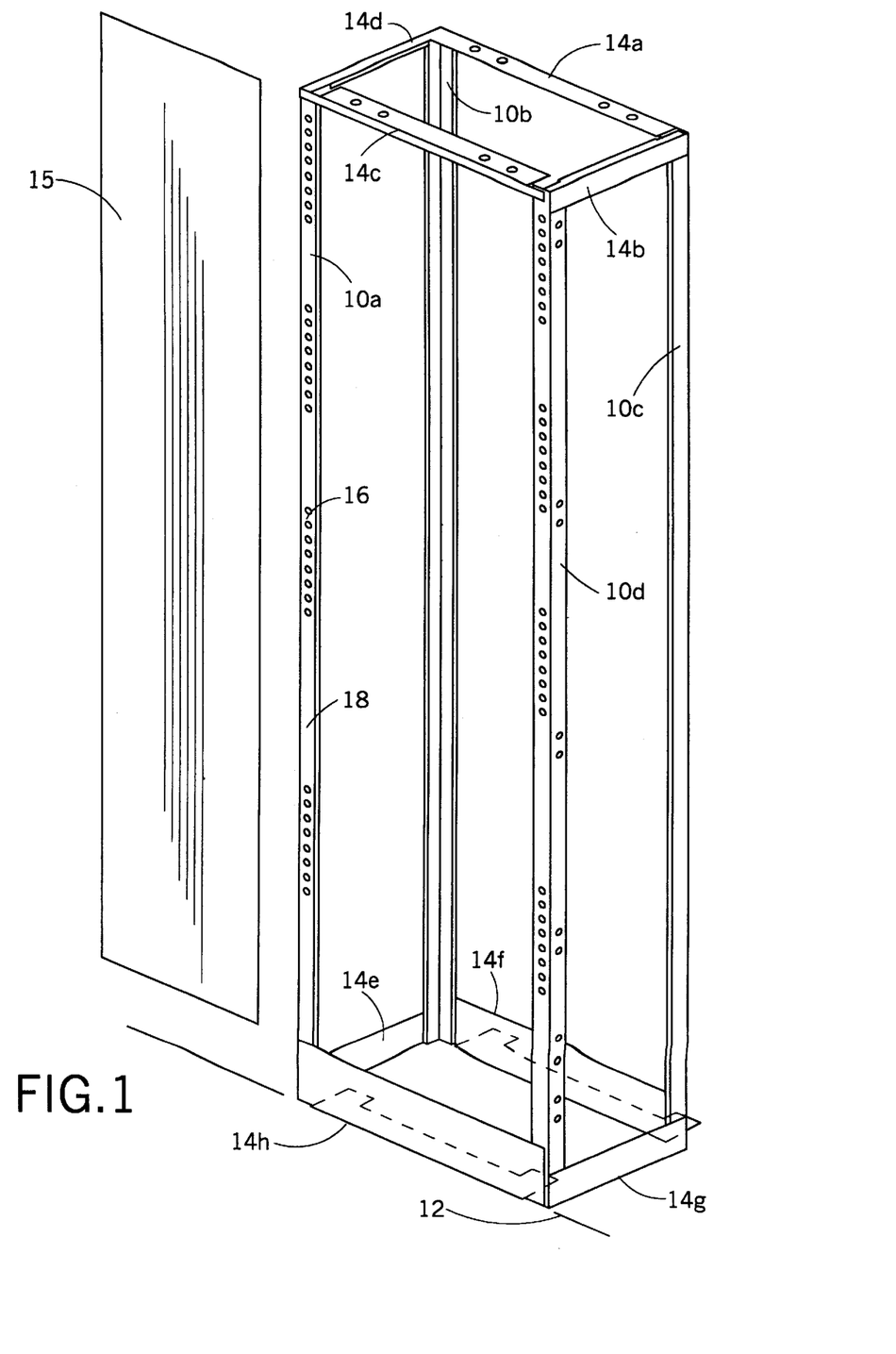
FIG. 1 is an illustration of the frame of a cabinet incorporating the adjustable tie rod according to the subject invention.

FIG. 1 details the outer frame of a multi-side cabinet according to the teachings of the present invention. FIG. 1 includes four corner supports 10a–10d which are in a vertical plane to floor area 12. The corner supports 10a–10d are interconnected via support rails 14a–14h. In the present embodiment the support rails interconnect with each other and the corner supports 10a–10d through the use of bolts, screws, clips, rivets, welding, molding or by other known connection means. In the present embodiment the interconnections form a generally rectangular frame, to which external cover panels are attached. The external cover panels include a back or rear cover panel, two side cover panels represented by and front cover panels 15. The front, rear, and side cover panels attachable to the frame so as to allow for access to front, rear, and side portions of devices located within the cabinet, when a panel is removed.

Each of corner supports 10a–10d and support rails 14a–14b have openings or through-holes which act as connection areas 16, 18 at selected locations along their respective lengths. These openings or through-holes 16, 18 are used in the further construction of the cabinet according to the present invention as connection locations between the corner supports, support rails and other elements of the cabinet as set forth below.

Support rails 14a–14h form the base and top of the cabinet and include flanges which allow the cabinet, if desired, to be attached to a floor surface such as a concrete floor or other support surface to allow for stabilization of the cabinet.

Figure 2:
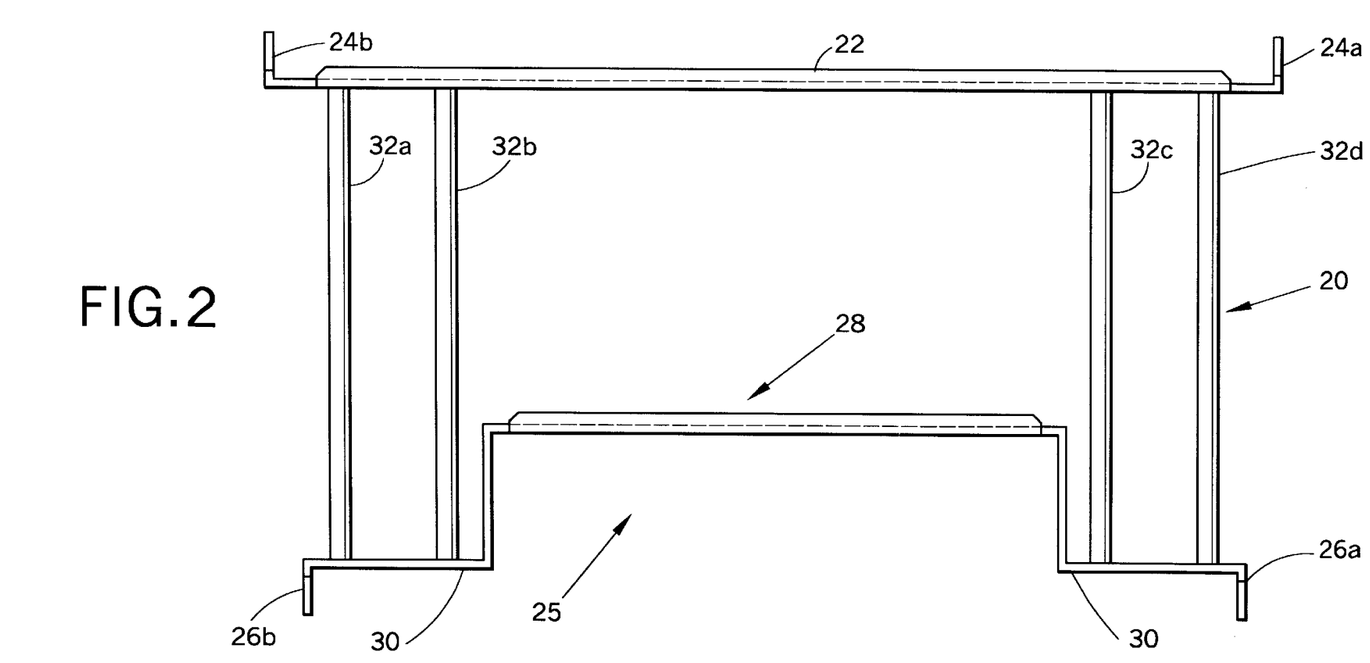
FIG. 2 is a top view of a mounting unit used in the cabinet of the present invention.

FIG. 2 is a top view of a mounting unit 20 of the present invention. Mounting unit 20 includes a back side portion 22 with angled end sections 24a–24b. Further included is a front portion 25 with right angled end sections 26a–26b. The front portion 25 includes a recessed area 28 set back from outer surface portion 30.

Figure 5:
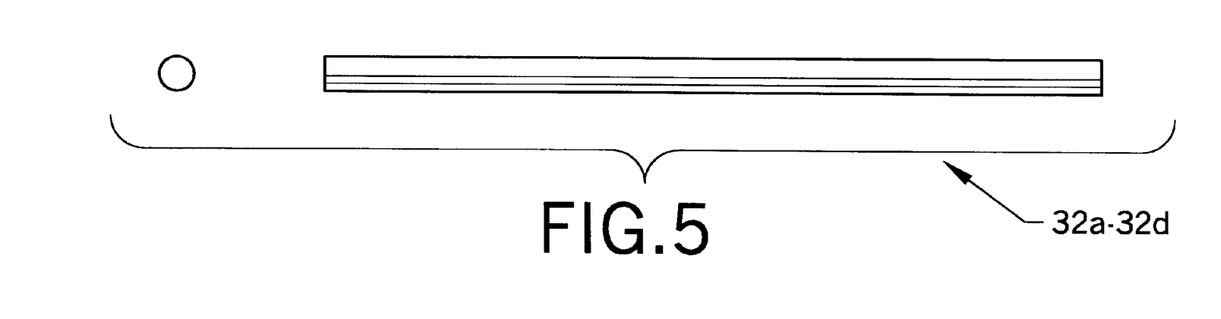
FIG. 5 shows top and front views of a bar used in the construction of the mounting unit of FIG. 2.

Back portion 22 and front portion 25 are connected or joined together through bars, also called grooming bars, 32a–32d, which are constructed in a rounded or tubular configuration as shown in FIG. 5. The ends of bars 32a–32d are joined to back portion 22 and front portion 25 by bolts, screws, welding, molding, clipping, riveting or other attaching procedure. Through this interconnection a stable secure mounting unit 20 is formed where back portion 22 and front portion 25 are in a substantially parallel relationship to each other, out to the respective angled end sections.

Figure 3:
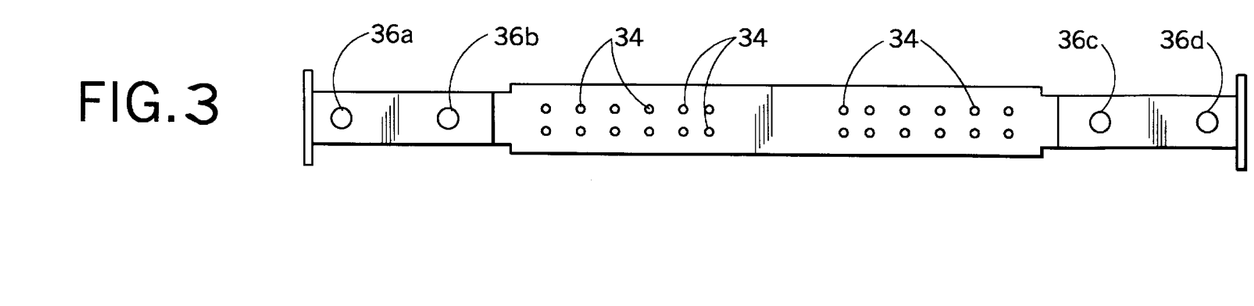
FIG. 3 is a front view of the front portion of the mounting unit of FIG. 2.

As illustrated in FIG. 3, front portion 25 of mounting unit 20 includes a plurality of openings or through-holes 34 and openings or attachment points 36a–36d where bars 32a–32d are joined thereto, such as by welding, etc. Through-holes or openings 34 are provided at spaced intervals for attachment of modules carried within the cabinet, as will be discussed below.

Figure 4:
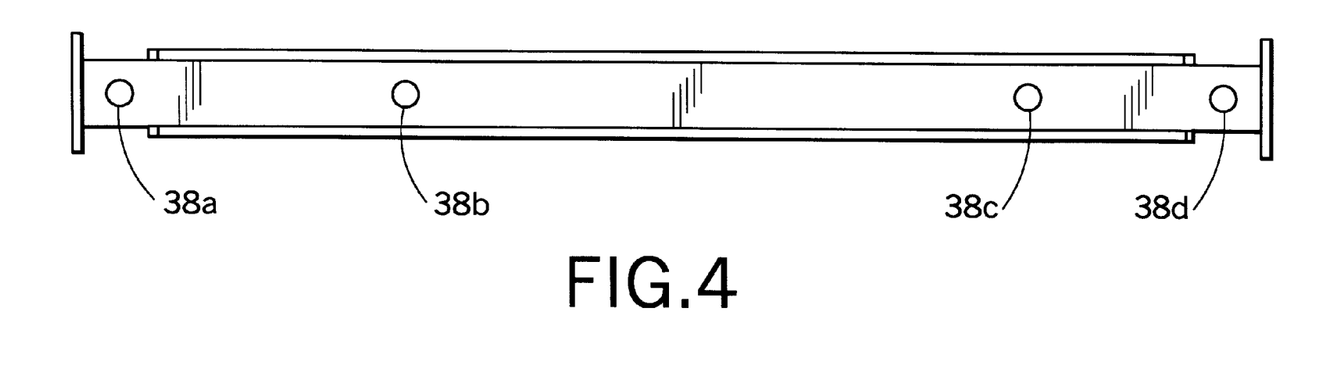
FIG. 4 is a front view of the back portion of the mounting unit of FIG. 2.

FIG. 4 provides a front view of back portion 22 of mounting unit 20. Openings or attachment points 38a–38d correspond to the locations where bars 32a–32d attach to back portion 22.

Returning attention to FIG. 2, each of angled end sections 24a, 24b, 26a and 26b include an opening for connection to an area on one of the corner supports 10a–10d.

Figure 6:
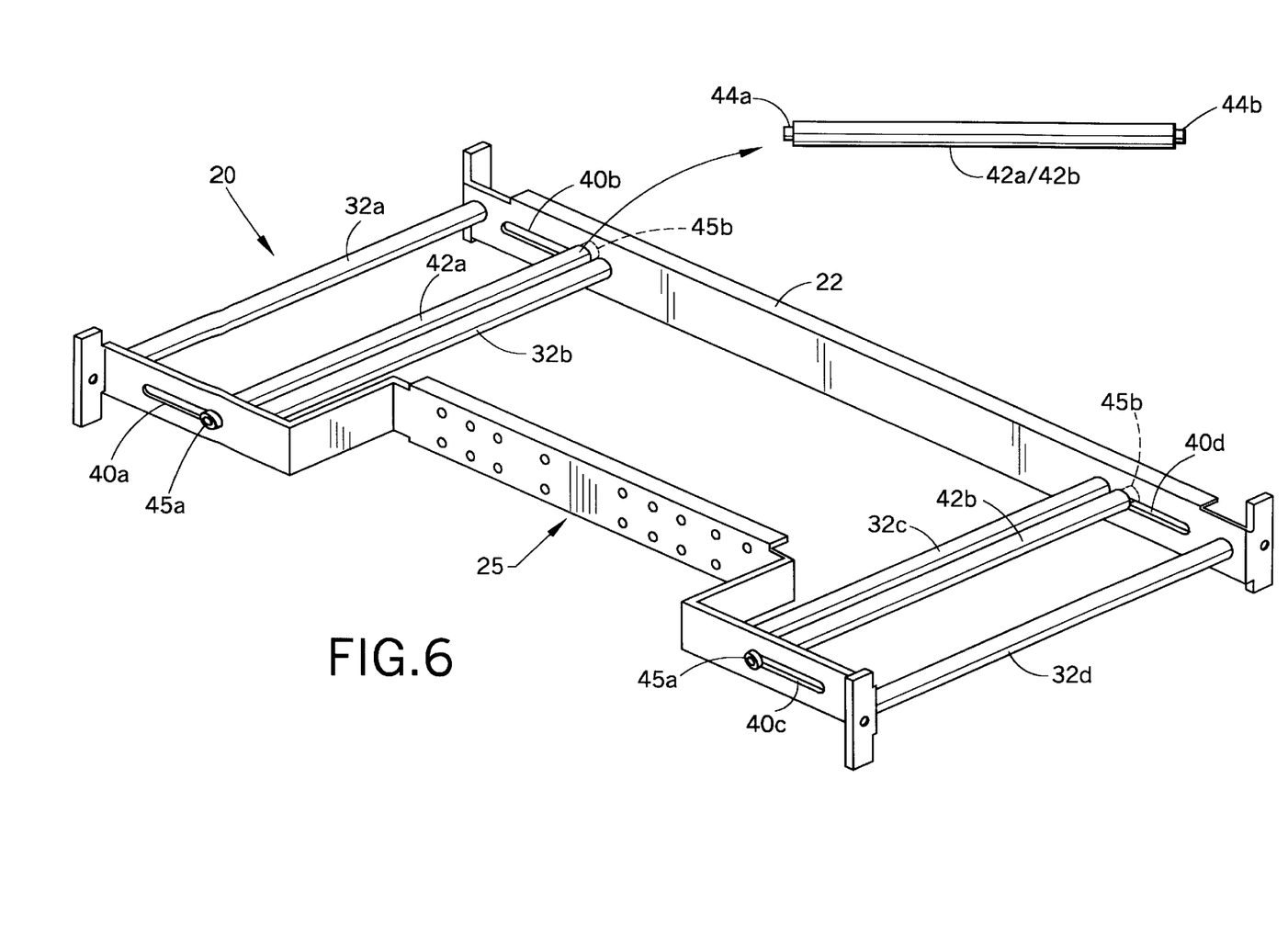
FIG. 6 illustrates the mounting units of FIG. 2 further including the adjustable tie rod of the present invention.

Further to the construction of mounting unit 20, attention is directed to FIG. 6. In selected sections of front portion 25 and back portion 22 are predetermined slots 40a–40d. These slots are located between pairs of grooming bars 32a–32b and 32c–32d. Adjustable tie rod elements 42a and 42b are inserted within respective slots 40a–40b and 40c–40d in a manner which allows for adjustable tie rods 42a, 42b to slide within the slotted areas.

To allow for adjustable tie rods 42a, 42b to be inserted within the slotted areas, in one embodiment, the adjustable tie rods are milled to provide extending portions 44a and 44b, which provide for self support of the adjustable rods in mounting unit 20. More particularly, extending portions 44a, 44b of each of the tie rods are inserted into the respective slots 40a–40b and 40c–40d.

In order to maintain the adjustable tie rods 42a, 42b within the slots, various arrangements are possible. In one embodiment, as shown in FIG. 6, 44a, 44b are configured to receive connectors such as bolts 45a, 45b to ensure the rods do not slip out of the slotted areas. It is understood that other configurations could also be used to maintain rods 42a, 42b within slots 40a–40d. In particular, rods 42a, 42b could be milled with a cap having a larger circumference than the body of the extending portions, with the rods then being angled into the slots. In the present embodiment, the bolts 45a, 45b may be attached through the use of tapped holes located in the center end of each side of the rods.

Using bolts 45a, 45b, rods 42a, 42b may be secured in mounting unit 20 which has previously been constructed. Particularly, the adjustable tie rods 44a, 44b may be added to a cabinet which has been previously configured. For example, in a cabinet according to the teachings of U.S. Pat. application Ser. No. 08/854,894, the rod may be installed either from the front or rear of the cabinet. Other type of connections which allow movement of the adjustable tie rods 42a, 42b, are of course also within the skill of one of ordinary skill in the art.

As previously discussed, it has been determined by the inventors that internal wiring of a cabinet using tie areas such as disclosed as U.S. patent application Ser. No. 08/854, 894 is unduly complicated and time consuming and increases the cost of such construction. Therefore, to improve the internal wiring/cabling for distribution cabinets, and in particular, multi-side distribution cabinets, it has been determined use of the adjustable tie rods 42a, 42b, as illustrated in FIG. 6 is desirable. Also, adjustable tie rods 42a, 42b, similar to grooming bars 32a–32d, have rounded bodies to avoid the existence of sharp edges.

Figure 7:
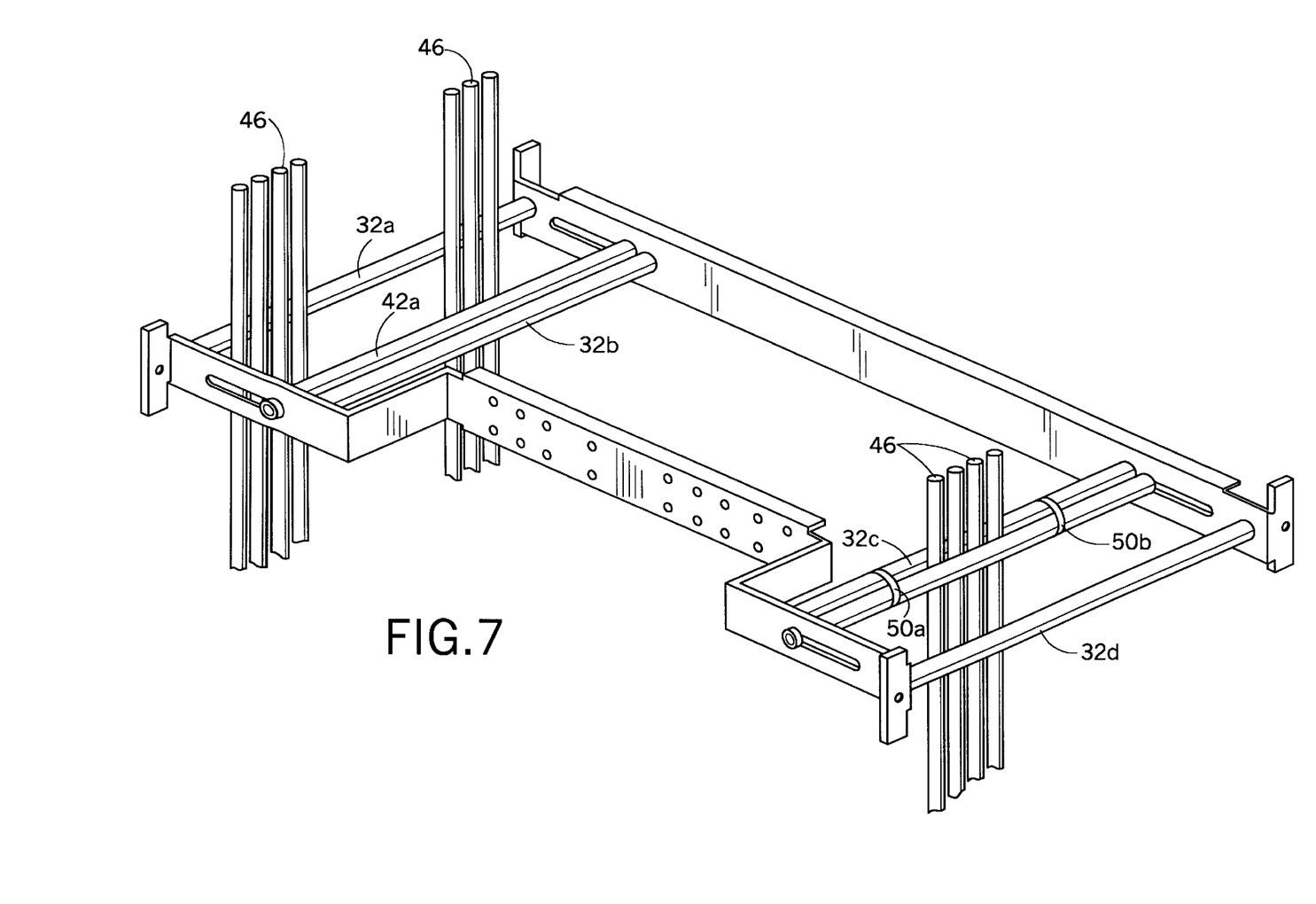
FIG. 7 illustrates the mounting unit constructed according to FIG. 6 holding a plurality of cables/wires.
Figure 8:
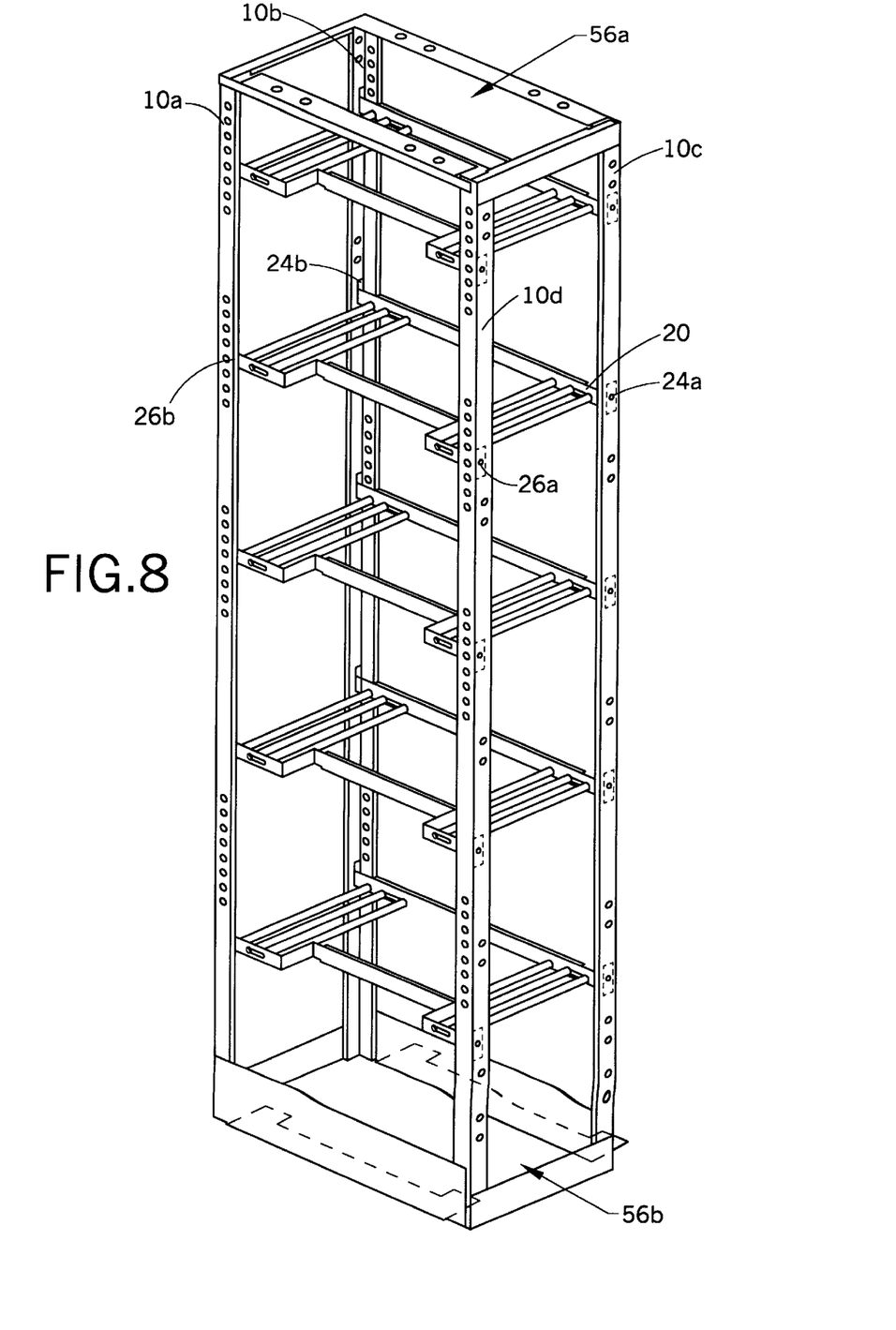
FIG. 8 illustrates the partially constructed cabinet of the present invention with the mounting units located at desired intervals.

Turning attention to FIG. 7, when mounting unit 20 is placed within a cabinet, such as shown for instance in FIG. 8, internal wires/cables 46 is passed through an area defined by grooming bars 32a–32b and 32c–32d respectively. As illustrated with regard to adjustable tie rods 42a, 42b, the wires/cables 46 pass on one or the other side of each of the adjustable tie rods 42a, 42b. With particular attention to adjustable tie rod 42a, wires/cables 46 are passed through an opening defined by adjustable tie rod 42a and grooming bar 32a. Once wires/cables 46 have been located in the desired positions adjustable tie rod 42a is moved towards grooming bar 32a until wires/cables 46 are held tightly between the two elements. At this point, bolts 45a and 45b are tightened to maintain adjustable tie rod 42a in a fixed position. As can be seen, the wires/cables are capable of being held in a manner where each wire/cable is clearly identifiable.

With attention to adjustable tie rod 42b, FIG. 7 shows this element having been moved into close relationship with wires/cables 46. As an alternative to the foregoing discussion, single or multiple wire/cable wraps or straps 50a, 50b can be used to maintain adjustable tie rod 42b in a desired fixed position. Particularly, wraps or straps 50a, 50b are connected to both grooming bar 32c, which is stationary, and the adjustable tie rod 42b. The wraps or straps 50a, 50b may be made of many materials and configurations which are well within the skill of one of the art.

By use of adjustable tie rods 42a, 42b, it is not necessary to individually wire groups of wires/cables 46. The above concepts add efficiency and desirability to modular power supply distribution units and cabinets.

It is to be appreciated that while the discussion has centered on a single adjustable tie rod element being placed between pairs of grooming bars, in some situations, if it is desirable, multiple adjustable tie rods may be used. Further, while the adjustable tie rod is shown in the present embodiment in a parallel relationship to the grooming bars, an arrangement can also be made wherein the adjustable tie rod elements are perpendicular or at some other angle to the grooming bars. In this embodiment, it would be desirable to have the adjustable tie rod elements with a configuration which allows them to be adjustably attached to the grooming bars in a perpendicular or otherwise angled position.

Mounting unit 20 described in the foregoing is one of a plurality of such units which can then be placed within a cabinet configuration. Particularly, FIG. 8 illustrates a plurality of mounting units 20 connected to the corner supports 10a–10d at angled end sections 24a, 24b, 26a and 26b. In FIG. 8, a number of mounting units 20 are connected to selected connection areas of corner supports 10a–10d such that there is a predetermined spacing between the mounting units. The spacing may be adjusted in accordance with the particular size module which is to be carried in the cabinet. In practice, the variations of spacing between the mounting units is a continuum limited only by the location of the corner supports 10a10d. It is to be appreciated that additional openings may be made in the corner supports thereby providing additional spacing choices.

Spaces provide locations where modularized electrical or electronic equipment may be inserted.

Figure 9:
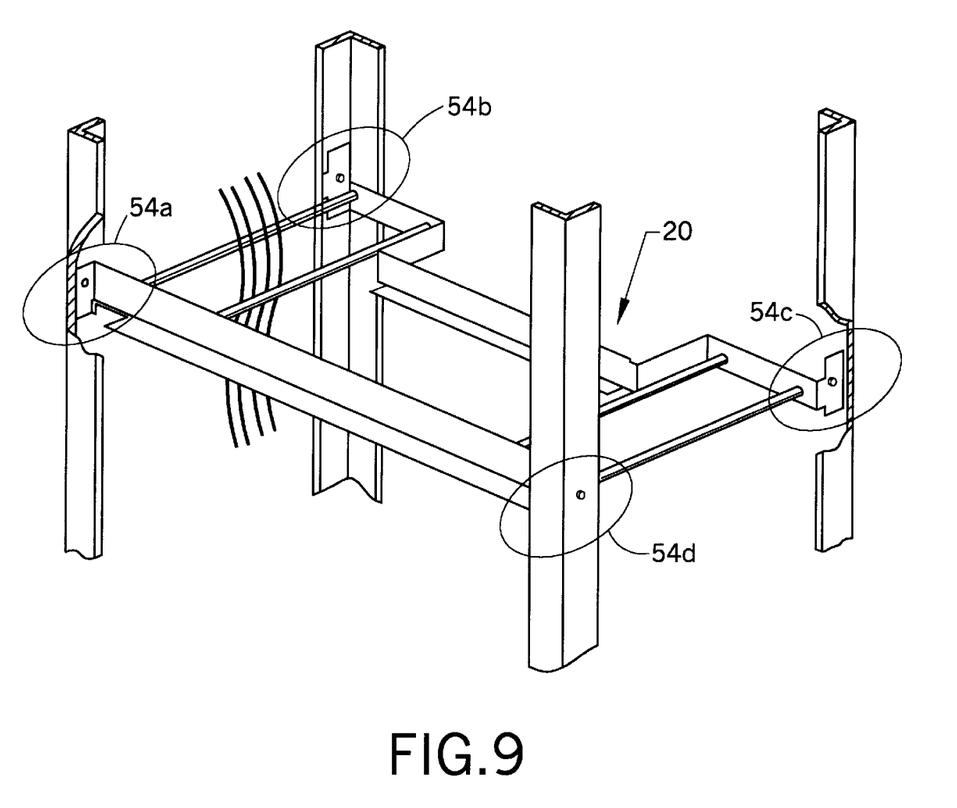
FIG. 9 illustrates a more detailed view of the interconnection between the frame and the mounting unit according to the present invention.

As can be seen more clearly in FIG. 9, by connecting angled end sections 24a, 24b, 26a and 26b to corner supports 10a–10d at areas 54a–54d, there is no need to connect any portion of mounting units 20 to a rear cover panel, front cover panel or side cover panel of the cabinet. This feature assists in front, rear and side access to the cabinet. It is noted that in construction of the mounting units 20, use of bars 32a–32d provides stabilization to the mounting units. The stabilization accomplished by use of bars 32a–32d includes structural stability for wires/cables 46 as they are passed through the formation of a wiring passage defined by these bars. The wires will not hit against the cabinet and will be segregated in a predefined area. Additionally, use of the corner supports 10a–10d provides for stability in the interconnection of the mounting units to the supports.

Returning attention to FIG. 8, a cabinet used in connection with the present invention may be designed to allow either a top entry 56a or bottom entry 56b for power cables. Power cables are not shown but they may be entered into the cabinet in the same manner as known in the art and described in the forgoing discussion. The only interconnections necessary for an end user is a connection at the top or bottom of the cabinet for the power cables. It is not necessary for the end user to run the power cables throughout the cabinet. Particularly, as shown in the cabinet of the present embodiment, both top and bottom access areas are provided in a single cabinet, as shown in FIG. 8.

With respect to the above description then, it is to be realized that the optimal dimensional relationships for the parts of the invention, to include variations in size, materials, shape, form, function and the manner of operation, assembly and use are deemed readily and apparent and obvious to one skilled in the art and all equivalent relations to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described and accordingly, all suitable modifications and equivalents may be resorted to falling within the scope of the invention.

In consideration thereof, we claim:

1. A multi-access communication power distribution cabinet for electronic/electric power termination devices, the cabinet comprising:

a plurality of corner supports arranged in a rectangular relationship to each other, each corner support having a plurality of connection areas;

a plurality of support rails interconnecting the corner supports to form a three dimensional rectangular frame;

a plurality of mounting units, each configured with a front portion and a back portion, the front portion and the back portion connected to each other through a first pair of bars and a second pair of bars perpendicular to the front and back portions, the first pair of bars arranged to form a first wire/cable passage and the second pair of bars arranged to form a second wire/cable passage, a first tie rod connected between the bars of the first pair of rods, such that the first tie rod is movable therebetween, a second tie rod connected between the bars of the second pair of bars such that the second tie rod is movable therebetween, the mounting units also including four end sections located at ends of each of the front and back portions, the mounting units attached to the corner supports by connection of the four end sections at selected connection areas of the corner supports, the mounting units located from each other at pre-selected intervals in substantially parallel planes to each other;

a plurality of electronic/electric modules each having a front section, a rear section and a module connection section, the module connection section connected to a front portion of each of two mounting units located from each other at the pre-selected intervals;

a bus bar located at least at one of a top section or a bottom section of the cabinet;

a set of cables at least some of the set having first ends connected to the power feed terminal means and having first ends connected to the bus bar and second ends connected to rear sections of selected modules;

a pair of side cover panels each having an exterior side and an interior side, each one of the side cover panels connected to two different ones of the corner supports, wherein the interior side has a substantially flat surface and is facing the interior of the cabinet;

a rear cover panel having an exterior side and an interior side, the rear cover panel connected to two different ones of the corner supports, wherein the interior side has a substantially flat surface and is facing the interior of the cabinet; and a front cover panel assembly having a plurality of front cover panels, each of the front cover panels having a interior side and an exterior side and each panel connecting to a front of the cabinet, the interiors of the front cover panels having substantially flat surfaces.

2. The cabinet according to claim 1 wherein the bars of the mounting units and tie rods are rod shaped, with rounded edges.

3. The cabinet according to claim 2 wherein each of the tie rods include extending portions on each end, the extending portions having a circumference smaller than the rest of the tie rod.

4. The cabinet according to claim 3 wherein each mounting unit include slots sized to receive at least one of the extending portions of the tie rods, where the tie rods move within the slots.

5. The cabinet according to claim 4 wherein the extending portions of the tie rods include tapped holes located in the end in to which is fitted a bolt.

6. The cabinet according to claim 5 wherein the slots are sized such that when wires/cables are passed through the wire/cable passage, the tie rod is capable of being moved towards the associated bars to thereby hold the wires/cables securely, and the bolt is configured to be tightened to thereby hold the tie rod in a fixed position.

7. The cabinet according to claim 1 wherein at least two tie rods are located between one of the first pair of bars and the second pair of bars.

8. The cabinet according to claim 4 further including at least one tie wrap configured to hold the tie rod to one of the bars.

9. The cabinet according to claim 8 wherein at least two tie rods are located between one of the first pair of bars and the second pair of bars.

10. A distribution cabinet comprising:

four corner supports arranged in a rectangular relationship to each other, each corner support having a plurality of connection areas;

a plurality of support rails interconnecting the corner supports to form a three-dimensional rectangular frame;

a plurality of mounting units, each configured with a front portion and a back portion, the front portion and the back portion connected to each other through a first pair of bars and a second pair of bars perpendicular to the front and back portions, the first pair of bars arranged to form a first wire/cable passage and the second pair of bars arranged to form a second wire/cable passage, a first tie rod connected between the bars of the first pair of rods, such that the first tie rod is movable therebetween, a second tie rod connected between the bars of the second pair of bars such that the second tie rod is movable therebetween, the mounting units also including four end sections located at ends of each of the front and back portions, each one of the four end sections connected to a corresponding one of the four corner supports, the mounting units located from each other at pre-selected intervals in substantially parallel planes to each other in a horizontal relationship to ground; and a plurality of electronic/electric modules connected to sections of the mounting units.

11. The cabinet according to claim 10 wherein the wire/cable passage is an integral part of the mounting unit.

12. The cabinet according to claim 1 wherein the bars of the mounting units and tie rods are rod shaped, with rounded edges.

13. The cabinet according to claim 2 wherein each of the tie rods include extending portions on each end, the extending portions having a circumference smaller than the rest of the tie rod.

14. The cabinet according to claim 3 wherein each mounting unit include slots sized to receive at least one of the extending portions of the tie rods, where the tie rods move within the slots.

15. The cabinet according to claim 4 wherein the extending portions of the tie rods include tapped holes located in the end in to which is fitted a bolt.

16. The cabinet according to claim 5 wherein the slots are sized such that when wires/cables are passed through the wire/cable passage, the tie rod is capable of being moved towards the associated bars, to thereby hold the wires/cables securely, and the bolt is configured to be tightened to thereby hold the tie rod in a fixed position.

17. The cabinet according to claim 1 wherein at least two tie rods are located between one of the first pair of bars and the second pair of bars.

18. A multi-access power distribution cabinet comprising;

a plurality of corner supports, each corner support having a plurality of connection areas;

a plurality of support rails interconnecting the corner supports to form a frame;

a plurality of mounting units, each configured with a front portion and a back portion, the front portion and the back portion connected to each other through a plurality of wire/cable passage bars perpendicular to the front and back portions, the wire/cable passage bars arranged to form a wire/cable passage, a tie rod inserted between two of the bars, wherein the tie rod is movable between the two bars, the mounting units also including end sections located at ends of each of the front and back portions, the mounting units attached to the corner supports by connection of the end sections at selected connection areas of the corner supports;

a pair of side cover panels connected to at least some of the corner supports, wherein interior of the side cover panels has a substantially flat surface;

a rear cover panel connected to at least some of the corner supports, wherein an interior of the rear cover panel has a substantially flat surface; and a front cover panel connected to a front of the cabinet, an interior of the front cover panel having a substantially flat surface.

\* \* \* \* \*